F. W. VAUGHAN.
CULTIVATOR ATTACHMENT.
APPLICATION FILED MAY 24, 1917.

1,281,235.

Patented Oct. 8, 1918.
2 SHEETS—SHEET 1.

Inventor
Fletcher W. Vaughan,

By Talbert & Parker
Attorneys

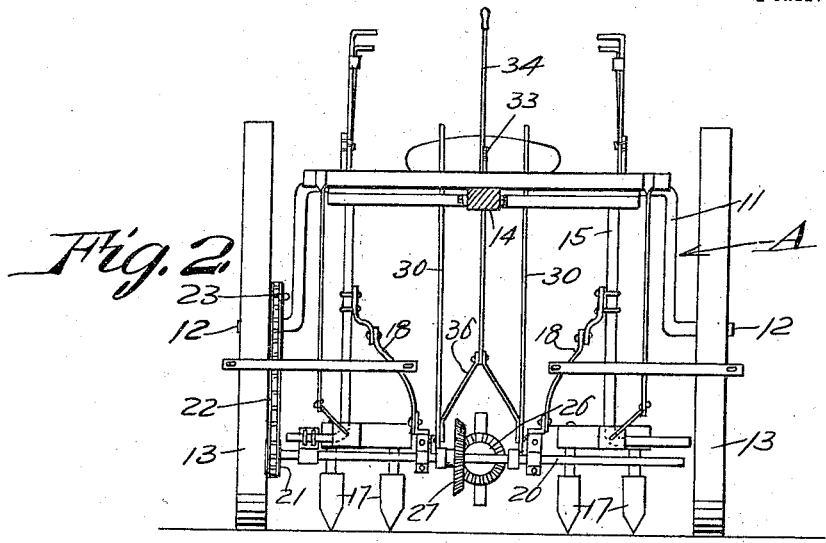

UNITED STATES PATENT OFFICE.

FLETCHER W. VAUGHAN, OF WELLINGTON, TEXAS.

CULTIVATOR ATTACHMENT.

1,281,235.　　　　Specification of Letters Patent.　　Patented Oct. 8, 1918.

Application filed May 24, 1917.　Serial No. 170,713.

*To all whom it may concern:*

Be it known that I, FLETCHER W. VAUGHAN, a citizen of the United States, residing at Wellington, in the county of Collingsworth and State of Texas, have invented certain useful Improvements in Cultivator Attachments, of which the following is a specification, reference being had therein to the accompanying drawing.

The invention relates to a cutlivator attachment, and more particularly to the class of cotton chopper attachments for cultivators.

The primary object of the invention is the provision of an attachment of this character wherein growing cotton can be cut the desired height and the rows thinned out when the occasion requires during the cultivation of the growing cotton in the operation of the cultivator.

Another object of the invention is the provision of an attachment of this character wherein it can be mounted upon different styles of cultivators without requiring any change in the construction or alteration therein.

A further object of the invention is the provision of an attachment of this character wherein the chopping blades will be driven from the wheel of the cultivator and said blades can be regulated as to height relative to the ground, as may be desired.

A still further object of the invention is the provision of an attachment of this character which is simple in construction, readily and easily mounted on and removed from a cultivator, quickly adjusted, strong, durable and inexpensive in manufacture and installation.

Other objects will be in part obvious and in part hereinafter set forth.

The invention accordingly consists in the features of construction, combination of elements and arrangement of parts which will be exemplified in the construction hereinafter described, and the scope of the application of which will be indicated in the appended claim.

In the accompanying drawings:

Fig. 2 is a front elevation;

Fig. 4 is a fragmentary perspective view of the attachment;

Fig. 5 is a fragmentary vertical longitudinal sectional view through the cultivator and attachment.

Similar reference characters indicate corresponding parts throughout the several views of the drawings.

Figure 1:
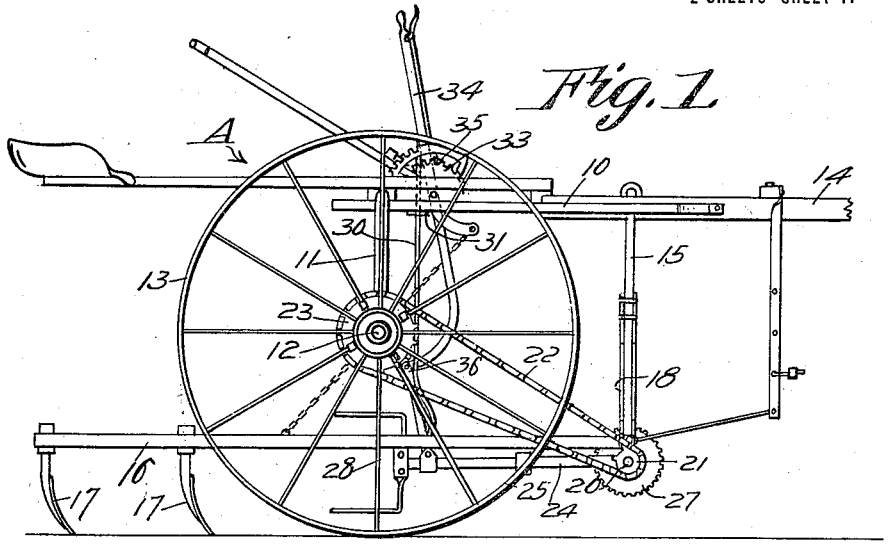
Figure 1 is a side elevation of a cultivator, showing the chopper attachment constructed in accordance with the invention applied.
Figure 3:
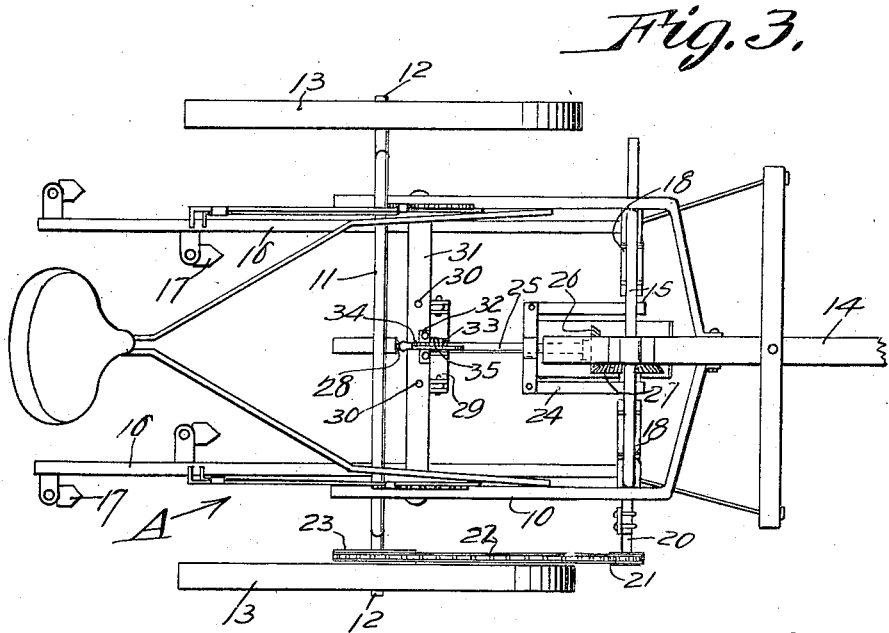
Fig. 3 is a top plan view.

Referring to the drawings in detail, A designates generally a cultivator having the main frame 10 in which is mounted the inverted substantially U-shaped axle arch 11 provided with the axle spindles 12 on which are journaled the wheels 13, while extending forwardly from the main frame 10 is the draft pole or beam 14, and depending from this beam is the front arch 15 on which are supported the gangs 16 for the blades 17 of the cultivator.

The cotton chopper attachment comprises a series of hangers 18 which are detachably fastened to the front arch 15 and are formed at their lower ends with bearings 19 in which is journaled a shaft 20 having at one end a sprocket wheel 21 over which is trained an endless sprocket chain 22, the same being also trained over a sprocket wheel 23 bolted or otherwise fastened to one of the wheels 13 at the inner side thereof concentrically of its hub, so that motion from this wheel will be imparted to the shaft 20 for the driving thereof. Loosely engaged upon the shaft 20 is a substantially U-shaped yoke 24 in the center of which is journaled a driven shaft 25 having on its inner end a beveled pinion 26 which meshes with a beveled companion gear 27 fixed to the shaft 20, while at the outer end of the shaft 25 which extends rearwardly between the gangs 16 is a double blade chopping head 28 which is designed to cut growing cotton and also for the thinning of the same between the rows when being cultivated in the usual manner by the cultivator.

The shaft 25 is journaled in a raising and lowering frame 29, the guide arms 30 of which work through a stationary guide piece 31 which is secured in any suitable manner to the frame of the cultivator, while supported upon an extension 32 from the side piece of the frame is a toothed keeper segment 33 to which is pivoted a throw lever 34 carrying a spring-held manually released latch 35 for coaction with the segment 33, and this lever has the connection 36 with the raising and lowering frame 29 so that on operating the lever 34 the said frame can be raised and lowered, and by the latch 35 locked in its adjusted position, thereby holding the chopping head 28 in its raised position for the cutting of the growing cotton the desired height or the thinning of the rows of cotton, it being understood, of course, that the chopping head 28 has a continuous rotary movement which is imparted thereto from one of the wheels 13 of the cultivator when the same is advanced through a field.

The yoke 24 permits the arcuate movement of the shaft 25 relative to the shaft 20, without interfering with the meshing of the gears connecting the shafts, as will be clearly apparent.

From the foregoing description, taken in connection with the accompanying drawings, the construction and operation of the herein described cultivator attachment will be readily apparent and, therefore, a more extended explanation has been omitted.

Having thus described my invention, I claim:

The combination with a cultivator having a front arch, of a cotton chopper attachment comprising hangers fixed to the front arch and depending therefrom, a transverse shaft journaled in the lower ends of the hangers and having connection with one of the wheels of a cultivator for the driving of said shaft, a yoke having its arms swingingly supported on the shaft, a longitudinally disposed driving shaft journaled in the medial portion of the yoke and having gear connection with the transverse shaft, a cotton chopping head mounted on the longitudinal shaft at its rear end, a guide frame having the rear portion of the longitudinal shaft journaled therein, guide arms depending from the cultivator for supporting the guide frame, links pivoted to the guide frame, a secondary rack on the cultivator, a lever pivoted to the rack and having the lower end pivoted to the links for insuring of the raising and lowering of the frame, a manually operable latch means on the lever for engaging the rack for locking the frame in either a raised or a lowered position.

In testimony whereof I affix my signature.

FLETCHER W. VAUGHAN.

Copies of this patent may be obtained for five cents each, by addressing the "Commissioner of Patents, Washington, D. C."